United States Patent [19]

Anderson

[11] 4,282,932
[45] Aug. 11, 1981

[54] ROCK PICKER

[76] Inventor: Raymond R. Anderson, Box 218, Ray, N. Dak. 58849

[21] Appl. No.: 90,317

[22] Filed: Nov. 1, 1979

[51] Int. Cl.³ .................. A01D 19/02; A01B 17/00
[52] U.S. Cl. ................................. 171/63; 171/19; 171/110; 171/141; 198/509
[58] Field of Search .............. 171/63, 64, 65, 10, 171/11, 19, 88, 89, 110, 144; 209/660, 675; 198/509

[56] References Cited

U.S. PATENT DOCUMENTS

| | | | |
|---|---|---|---|
| 2,804,156 | 8/1957 | Greaves | 171/63 |
| 3,431,979 | 3/1969 | Gregerson | 171/63 |
| 3,443,644 | 3/1969 | Schindelka | 171/63 |
| 3,599,724 | 8/1971 | Fraske | 171/63 |
| 3,638,735 | 2/1972 | Deneky | 171/63 |
| 3,702,509 | 11/1972 | Zowaski | 198/509 |
| 4,113,023 | 9/1978 | Baskett | 171/19 |

Primary Examiner—Robert A. Hafer
Attorney, Agent, or Firm—Williamson, Bains, Moore & Hansen

[57] ABSTRACT

This rock picker invention is a towable farm implement which is capable of removing rocks from a farm field. A plurality of buckets scoop up quantities of soil as the rock picker is towed by a tractor. The buckets are mounted on a pair of cables which pass over guide wheels. The cables are forced to move by a power source so that the buckets are forced into, across and out of the ground. The guide wheels are mounted on axles on a conveyor frame which allows the buckets and cables to be lifted to a transport position and which allows the angle of attack between the buckets and the ground surface to be varied. The buckets are equipped with openings and shaped such that soil falls from the buckets when the buckets are lifted. The cables are guided such that the buckets are caused to invert and dump the rocks collected into a hopper. The hopper is equipped with a lifting linkage to allow transfer and disposal of rocks collected. The rock picker is equipped with forwardly mounted harrows and gathering sections that aid in the collection of rocks.

14 Claims, 11 Drawing Figures

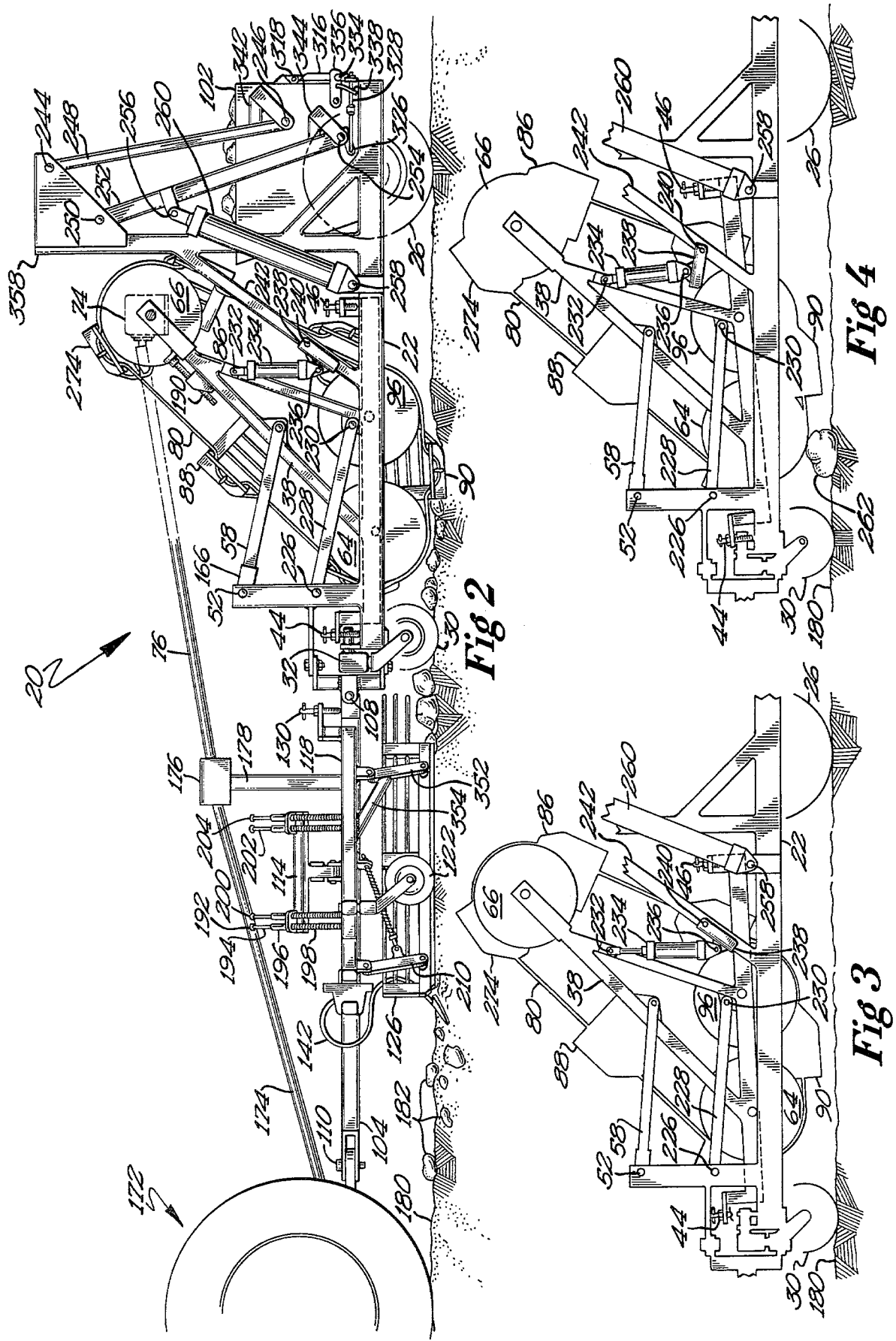

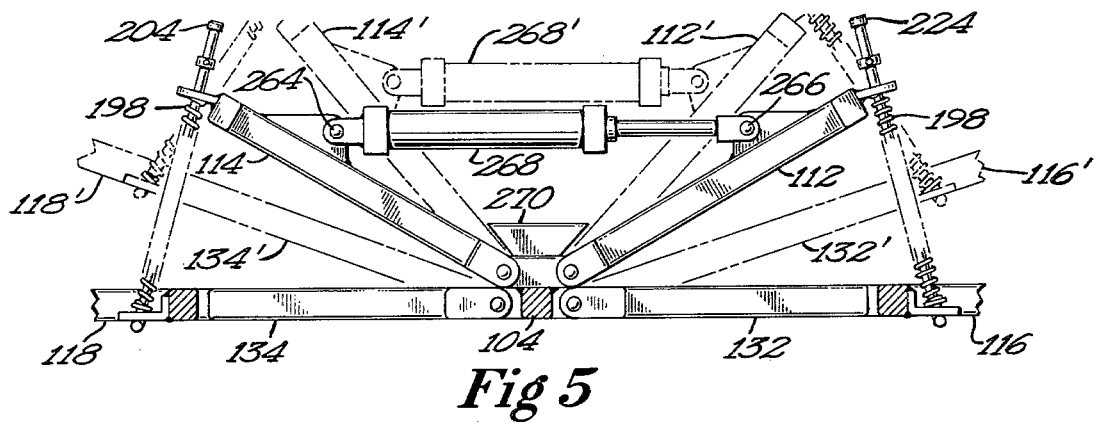
Fig 5
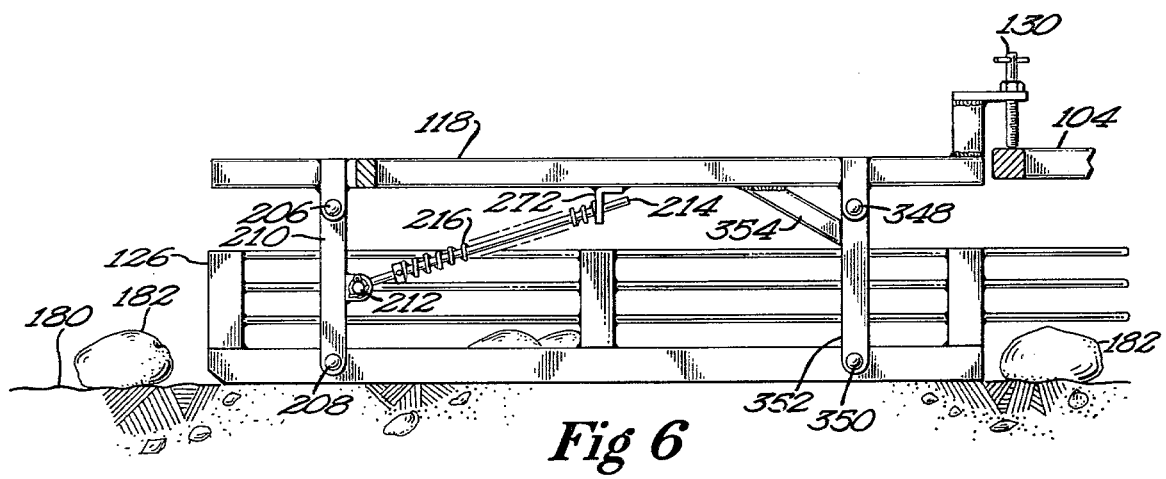
Fig 6
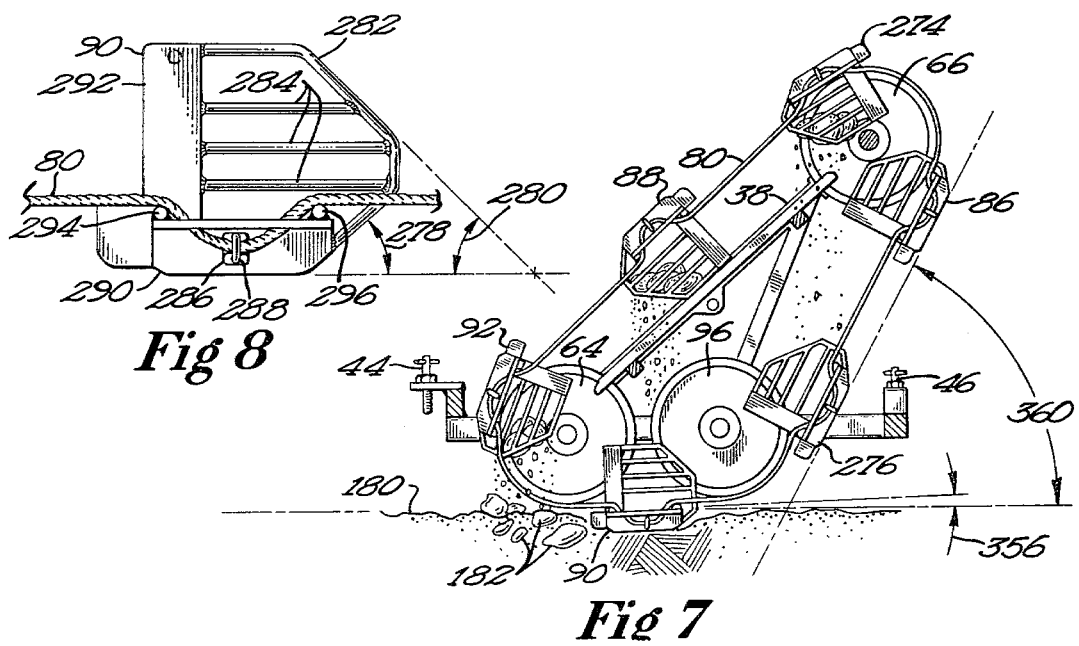
Fig 8
Fig 7

ROCK PICKER

BACKGROUND OF THE INVENTION

This invention relates generally to farm implements and relates more particularly to towable implements for picking rocks from soil.

Prior art rock pickers have included types mounted to tractors including means for loading rocks into a rake or scoop together with means for raising the rake and dumping the stones from the raised position of the rake as shown by Weigel in U.S. Pat. No. 2,763,975. Weigel shows a scoop equipped with a rake having pointed teeth. In U.S. Pat. No. 2,812,029 Sund shows a towable rock picker having tines driven by a pair of chains which pass over sprockets. Sund arranges the chains so that rocks are caused to fall from the tines into a bucket.

Fraske discloses a rock picker having a pickup reel with teeth mounted thereon in U.S. Pat. No. 3,599,724. The teeth rotate continuously and sweep substantially parallel with the ground for a considerable distance thus facilitating the picking action. Fraske shows tracks and cam followers to control the position of stone pickup assemblies. A tractor mounted, ground-raking and rock-gathering apparatus is shown in Pat. No. 3,637,024 by Baskett. Baskett shows arcuately shaped teeth driven by a set of chains mounted on two sets of three guide sprockets. In Baskett's invention, the teeth rake the ground, gather the rocks and other debris and move it into a bucket. The bucket used is a conventional one attached to a front end loader type tractor. Hydraulic cylinders to raise and lower a sand cutting blade used in a beach cleaner apparatus is shown by Teixeira in U.S. Pat. No. 4,014,390. The sand cutting blade extends downward from the beach cleaner chassis at an oblique angle with respect to the surface of the sand and has a variable angle of attack.

U.S. Pat. No. 4,040,490 was granted to the instant inventor and shows a rock windrower having an elongated rake structure for windrowing surface rocks.

SUMMARY OF THE INVENTION

Accordingly, it is an object of this invention to provide a rock picker capable of picking rocks from a farm field.

Another object of this invention is to provide a rock picker which is highly efficient at collecting rocks and is highly effective at separating soil from the collected rocks.

A further object of this invention is to provide a rock picker capable of collecting rocks having a wide range of sizes.

Another object of this invention is to provide a rock picker for collecting rocks from surface and sub-surface locations.

A further object of this invention is to provide a rock picker having means for varying the depth into the ground from which rocks are picked.

Another object of this invention is to provide a rock picker having means for varying the angle of attack between rock picking buckets and the surface of the ground.

A further object of this invention is to provide a rock picker capable of moving into a transport position such that the rock picker may be towed over roads or highways.

Still another object of my invention is to provide a rock picker having safety mechanisms such that the rock picker is not damaged when obstructions are encountered.

Another object of my invention is to provide a rock picker which is effective at collecting rocks over a wide swath as it moves across the ground.

A further object of my invention is to provide a rock picker having a rock collecting hopper which may be raised and dumped by remote command.

Briefly, my rock picker invention involves buckets for scraping the ground which are mounted on cables which pass over three sets of guide wheels. The guide wheels direct the cable such that the buckets are forced into, across, and out of the ground. An external power source is coupled to one of the sets of wheels to cause the cables and buckets to move. The buckets have holes in them to allow rocks of a selected minimum size to be retained. As the buckets are conveyed away from the ground, substantially all of the soil falls from the buckets and only the collected rocks remain. An upper guide wheel set causes the buckets to invert and dump and collected rocks into a hopper. The three sets of guide wheels are attached to a conveyor frame which may be raised, lowered or tilted. Rocks collected in the hopper may be dumped out by actuating a pair of hydraulic cylinders which act through linkages to lift, tilt and dump the bin. A pair of gathering sections are mounted on the rock picker to funnel rocks into the buckets.

These and other objects and advantages of my invention will appear more fully from the following description made in conjunction with the accompanying drawings wherein like reference characters refer to the same or similar parts throughout the several views.

DESCRIPTION OF THE DRAWINGS

FIG. 2 is a side elevational view of the rock picker taken from the direction 2—2 indicated in FIG. 1;

FIG. 3 is a partially cut away side elevational view of a portion of the rock picker shown raised in a transport position;

FIG. 4 is a partially cut away side elevational view of a portion of the rock picker shown raised in an obstacle avoiding position;

FIG. 5 is a sectional, elevational view of a portion of the rock picker taken along the line 5—5 of FIG. 1;

FIG. 6 is an elevational view of a portion of the rock picker taken along the line 6—6 of FIG. 1;

FIG. 7 is a sectional, elevational view of a portion of the rock picker taken along the line 7—7 of FIG. 1;

FIG. 8 is a side elevational view of a bucket used in the rock picker;

DESCRIPTION OF THE PREFERRED EMBODIMENT

Figure 1:
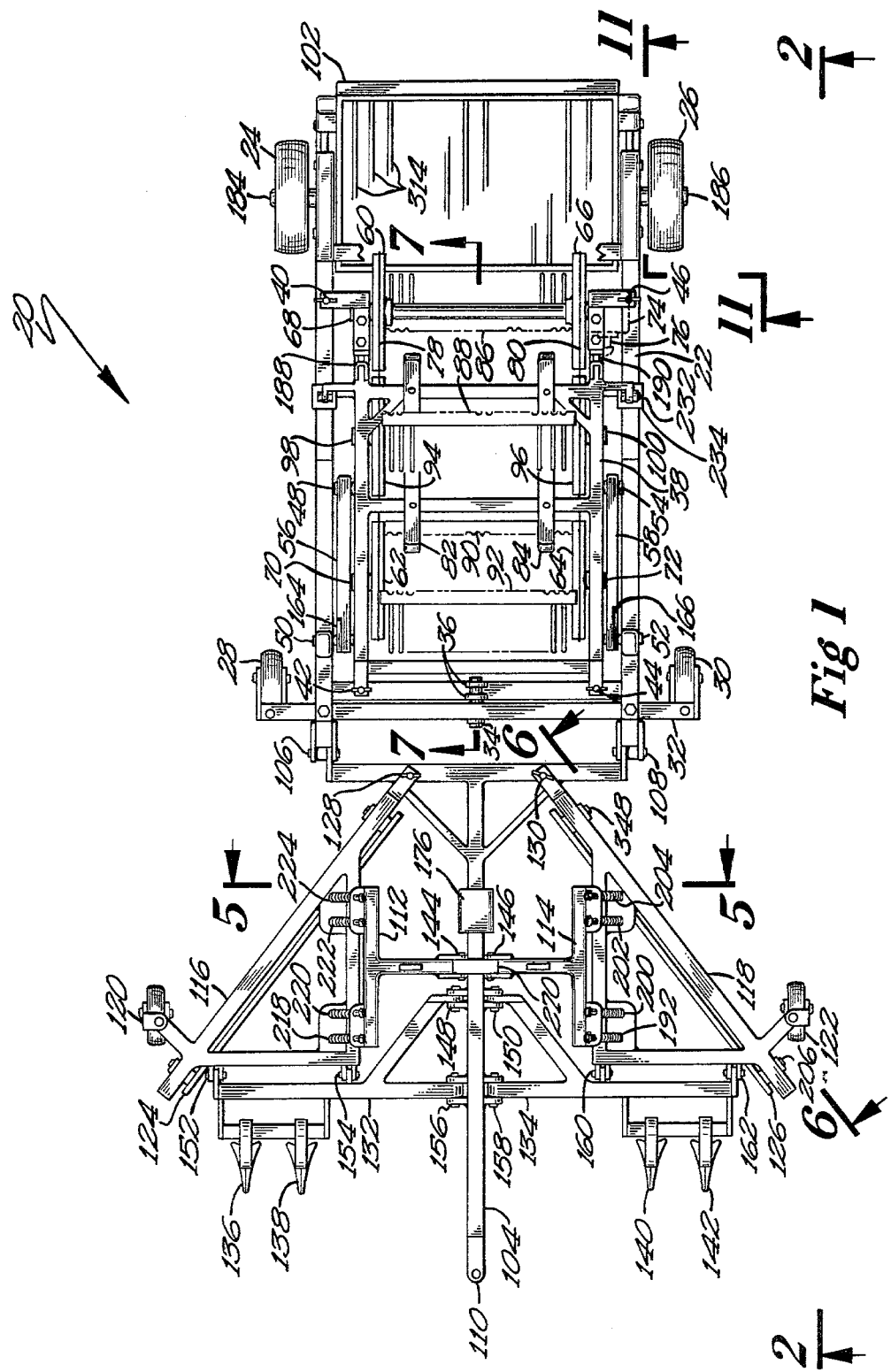
FIG. 1 is a partially cut away top plan view of the rock picker.

Referring first to FIG. 1, the rock picker 20 is shown. Stub axles 184 and 186 are attached to picker frame 22. Ground engaging wheels 24 and 26 are mounted for rotation on stub axles 184 and 186, respectively. Plates 36 are welded to picker frame 22. Hinge pin 34 is attached to plates 36. Crossbar 32 is mounted for rotation on hinge pin 34. Ground engaging caster wheels 28 and 30 are mounted on opposite ends of crossbar 32.

Conveyor frame 38 is positioned inside picker frame 22. Bolts 40, 42, 44 and 46 are threadably mounted in conveyor frame 38 and are positioned over picker frame 22. Bolts 40, 42, 44 and 46 place a lower limit on the vertical travel of conveyor frame 38 with respect to picker frame 22. Hinge pins 48 and 54 are attached to conveyor frame 38. Links 56 and 58 are mounted for rotation on hinge pins 48 and 54, respectively. Hinge pins 50 and 52 are attached to picker frame 22. Fittings 164 and 166 are mounted for rotation on hinge pins 50 and 52, respectively. Link 56 is attached to fitting 164 in one of a plurality of predetermined attachment positions. Said plurality of attachment positions between link 56 and fitting 164 allow the distance between hinge pin 48 and hinge pin 50 to be adjusted to a corresponding one of a plurality of predetermined lengths. Similarly, link 58 is attached to fitting 166 in one of a plurality of predetermined attachment positions. Thus, the distance between hinge pin 54 and hinge pin 52 is determined by the position of attachment of link 58 to fitting 166.

Fitting 168 and fitting 170 are slidably mounted on conveyor frame 38. Bolts 188 and 190 are retained by fittings 168 and 170, respectively. Bolts 188 and 190 are threadably mounted on conveyor frame 38 and serve to control the sliding movement of fittings 168 and 170, respectively, on conveyor frame 38. Upper guide wheels 60 and 66 are attached to axle 68 which is mounted for rotation on fittings 168 and 170. Gear box 74 is connected to transmit rotational speed between shaft 76 and axle 68.

Stub axles 70 and 72 are aligned and are attached to conveyor frame 38. Lower guide wheels 62 and 64 are mounted for rotation on stub axles 70 and 72, respectively. Stub axles 98 and 100 are aligned and are attached to conveyor frame 38. Lower guide wheels 94 and 96 are mounted for rotation on stub axles 98 and 100, respectively. Cable 78 passes over wheels 60, 62 and 94. Wheels 60, 62 and 94 are aligned so that cable 78 travels in a substantially straight path. Cable 80 passes over wheels 64, 66 and 96. Wheels 64, 66 and 96 are aligned so that cable 80 travels in a substantially straight path.

Buckets 86, 88, 90 and 92 are each attached between cables 78 and 80. Supports 82 and 84 are attached to conveyor frame 38 and are positioned to support buckets 86, 88, 90 and 92 as they are conveyed upward by cables 78 and 80. Rocks which are collected by buckets 86, 88, 90 and 92 are deposited in hopper 102, which is a large, open-spaced bin.

Hinge pins 106 and 108 are aligned and are attached to picker frame 22. Tongue bar 104 is mounted for rotation on hinge pins 106 and 108. Hitch pin 110 is attached to tongue bar 104 and provides a point of attachment so that rock picker 20 may be towed. Hinge pins 144 and 146 are attached to tongue bar 104. Lift frames 112 and 114 are mounted for rotation on hinge pins 144 and 146, respectively. Hinge pins 148 and 156 are aligned and are attached to tongue bar 104. Harrow frame 132 is mounted for rotation on hinge pins 148 and 156. Harrows 136 and 138 are attached to harrow frame 132. Hinge pins 150 and 158 are aligned and are attached to tongue bar 104. Harrow frame 134 is mounted for rotation on hinge pins 150 and 158. Harrows 140 and 142 are attached to harrow frame 134.

Hinge pins 152 and 154 are aligned and are attached to harrow frame 132. Gathering frame 116 is mounted for rotation on hinge pins 152 and 154. Ground engaging caster wheel 120 is mounted on gathering frame 116. Bolt 128 is threadably attached to gathering frame 116 and is positioned over tongue bar 104. Gathering section 124 is carried by gathering frame 116.

Hinge pins 160 and 162 are aligned and are attached to harrow section 134. Gathering frame 118 is mounted for rotation on hinge pins 160 and 162. Ground engaging caster wheel 122 is mounted on gathering frame 118. Bolt 130 is threadably attached to gathering frame 118 and is positioned over tongue bar 104. Gathering section 126 is carried by gathering frame 118.

Control assemblies 218, 220, 222 and 224 are connected between lift frame 112 and gathering frame 116. Similarly, control assemblies 192, 200, 202 and 204 are connected between lift frame 114 and gathering frame 118. Control assemblies 192, 200, 202, 204, 218, 220, 222 and 224 are substantially identical in construction.

Referring next to FIG. 2, rock picker 20 is towed by tractor 172. The function of rock picker 20 is to travel over the ground 180 and pick up rocks 182. Tractor 172 provides rotational speed to shaft 174. Coupling 176 transmits rotational speed from shaft 174 to shaft 76. Support 178 is attached to tongue bar 104. Coupling 176 is mounted on support 178.

Control assembly 192 is connected between lifting frame 114 and gathering frame 118. Control assembly 192 includes a rod 194 which is retained on gathering frame 118 and which is slidably mounted through frame 114. Control assembly 192 further includes coil spring 198 positioned around rod 194 between lifting frame 114 and gathering frame 118. Control assembly 192 further includes collar 196 mounted on rod 194 above lifting frame 114. Control assemblies 200, 202 and 204 are similar in construction to control assembly 192 and are connected between lifting frame 114 and gathering frame 118.

Hinge pin 226 is attached to picker frame 22. Line 228 is mounted for rotation on hinge pin 226. Hinge pin 230 is attached to conveyor frame 38. Link 228 is mounted for rotation on hinge pin 230.

Hinge pin 232 is attached to conveyor frame 38. Hydraulic cylinder 234 is mounted for rotation on hinge pin 232. Hinge pin 240 is attached to member 242 of picker frame 22. Fitting 238 is mounted for rotation on hinge pin 240 and is positioned above member 242. Hinge pin 236 is attached to fitting 238. Hydraulic cylinder 234 is mounted for rotation on hinge pin 236.

Hinge pin 244 is attached to upright member 358 of picker frame 22. Link 248 is mounted for rotation on hinge pin 244. Hinge pin 246 is attached to hopper 102. Link 248 is mounted for rotation on hinge pin 246. Hinge pin 250 is attached to upright member 358 of picker frame 22. Link 252 is mounted for rotation on hinge pin 250. Hinge pin 254 is attached to hopper 102. Link 252 is mounted for rotation on hinge pin 254. Hinge pin 256 is attached to link 252 between hinge pins 250 and 254. Hydraulic cylinder 260 is mounted for rotation on hinge pin 256. Hinge pin 258 is attached to picker frame 22. Hydraulic cylinder 260 is mounted for rotation on hinge pin 258. Upright member 358 is a generally upright post supported by member 242.

FIG. 3 shows conveyor frame 38 raised in a transport position. FIG. 4 shows conveyor frame 38 raised in an obstacle avoiding position as a result of guide wheel 64 striking rock 262.

Referring next to FIG. 5, hinge pin 264 is attached to lift frame 114. Hydraulic cylinder 268 is mounted for rotation on hinge pin 264. Hinge pin 266 is attached to lift frame 112. Hydraulic cylinder 268 is mounted for rotation on hinge pin 266. Hydraulic cylinder 268 is shown in an extended condition in FIG. 5.

Hydraulic cylinder 268′ (drawn in phantom) corresponds to hydraulic cylinder 268 in a contracted condition. Life frames 112′ and 114′ (shown in phantom) correspond to the positions of lift frames 112 and 114, respectively, in a transport position. Gathering frames 116′ and 118′ (shown in phantom) correspond to the positions of gathering frames 116 and 118, respectively, in a transport position. Harrow frames 132′ and 134′ (shown in phantom) correspond to the positions of harrow frames 132 and 134, respectively, in a transport position. Block 270 is attached to tongue bar 104 and is placed between lift frames 112 and 114. As shown, block 270 is shaped to closely fit between lift frames 112′ and 114′.

Referring next to FIG. 6, hinge pin 206 is attached to gathering frame 118. Hinge pin 208 is attached to gathering section 126. Link 210 is mounted for rotation on hinge pin 206. Also, link 210 is mounted for rotation on hinge pin 208. Hinge pin 212 is attached to link 210 between hinge pins 206 and 208. Rod 214 is mounted for rotation on hinge pin 212. Flange 272 is attached to gathering frame 118. Rod 214 is slidably mounted through flange 272. Coil spring 216 is slidably mounted on rod 214 between link 210 and flange 272.

Hinge pin 348 is attached to gathering frame 118. Hinge pin 350 is attached to gathering section 126. Link 352 is mounted for rotation on hinge pin 348. Also, link 352 is mounted for rotation on hinge pin 350. Bar 354 is attached to gathering frame 118. Bar 354 is positioned in front of link 352 and provides a positive forward obstacle to the rotation of link 352 about hinge pin 348.

In FIG. 7, buckets 86, 88, 90 and 92 are shown in use, collecting rocks 182 from the ground 180. Buckets 274 and 276 are also shown which are similar in construction to buckets 86, 88, 90 and 92.

Referring next to FIG. 8, bucket 90 includes wire 282 formed as shown wherein angle 278 preferably is 38° and angle 280 is preferably 48°. Wire 282 is welded to plate 292. Side bars 284 are welded between plate 292 and wire 282. Cable 80 passes over bars 294 and 296 and passes through flange 290. Cable 80 is securely clamped to bucket 90 by means of trapping cable 80 between U-bolt 288 and fixture 286.

Figures 9, 10, 11:
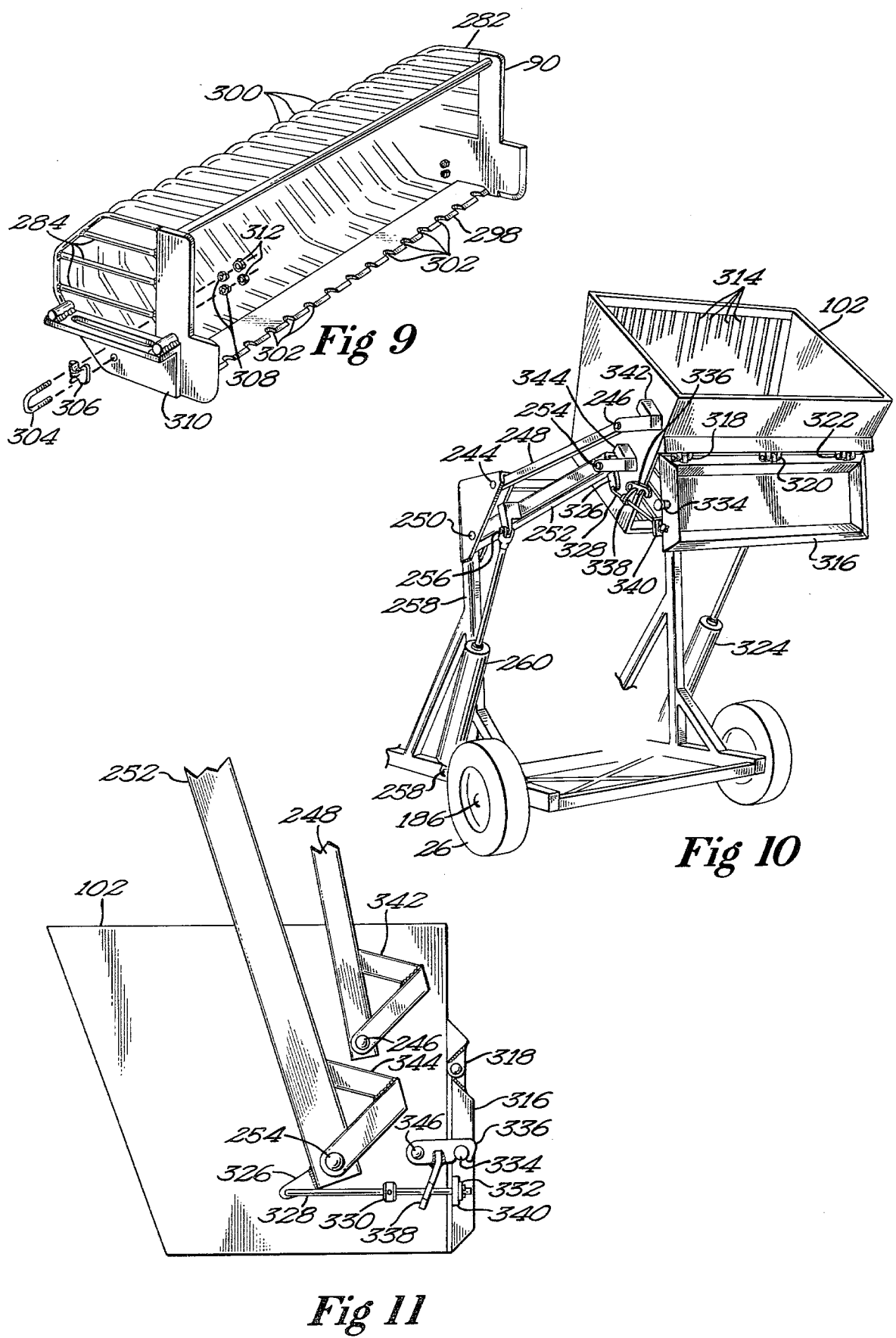
FIG. 9 is a partially exploded perspective view of a bucket used in the rock picker.
FIG. 10 is a perspective view of a portion of the rock picker showing the hopper in a raised position.
FIG. 11 is a side elevational view of the hopper used by the rock picker invention taken along the line 11—11 of FIG. 1.

Referring next to FIG. 9, bucket 90 includes a plurality of wires 300 shaped in the same way as wire 282. A ground-engaging blade 298 is attached to bucket 90 and includes a plurality of notches 302. Blade 298 is preferably a heavy, straight length of steel or other metal which is highly durable to avoid damage when struck by rocks. U-bolt 304 and fixture 306 are retained on flange 310 by means of lock washers 308 and threaded nuts 312.

Referring next to FIG. 10, spaced-apart wires 314 form the front and bottom of hopper 102. Hinge pins 318, 320 and 322 are attached to hopper 102. Door 316 is mounted for rotation on hinge pins 318, 320 and 322. Hydraulic cylinders 260 and 324 are shown in their extended condition.

In FIG. 11, hopper 102 is shown in its lowered position corresponding to that shown in FIG. 2. Stop 342 and 344 are attached to hopper 102 and make contact with links 248 and 252, respectively. Crank 326 is attached to link 252. Push rod 328 is mounted for rotation through crank 326. Flange 340 is attached to door 316. Push rod 328 is slidably mounted through flange 340. Hinge pin 346 is attached to hopper 102. Latch 336 is mounted for rotation on hinge pin 346. Lever 338 is attached to latch 336. Push rod 328 is slidably mounted through lever 338. Collar 330 is mounted on push rod 328 between crank 326 and lever 338. Collar 332 is mounted on push rod 328 on the length of push rod 328 away from flange 340. Post 334 is attached to door 316. When door 316 is closed as shown in FIG. 11, latch 336 fits over and traps post 334.

In operation, rock picker 20 is towed across the ground by a tractor 172 and is used to remove rocks 182 from the ground 180 and place them in a hopper 102. Harrows 136, 138, 140 and 142 are preferably composed of spring steel and act to loosen the ground 180 from which rocks 182 are to be removed. Gathering sections 124 and 126 follow the harrows 136, 138, 140 and 142 and act to funnel rocks 182 into a narrow path for collection. Buckets 86, 88, 90, 92, 274 and 276 scrape rocks 182 from the ground 180 and convey them upward and dump them into hopper 102. Thus, gathering sections 124 and 126 gather together the rocks to be collected by buckets 86, 88, 90, 92, 274 and 276.

Gathering section 126 is pivotably mounted on gathering frame 118 by means of links 210 and 352. Spring 216 forces gathering section 126 forwardly and downwardly into the ground 180, thus causing gathering section 126 to conform to irregularities in the ground 180. Bar 354 prevents gathering section 126 from swinging too far in a forward direction. Gathering section 124 is mounted to gathering frame 116 in substantially the same way that gathering section 126 is mounted to gathering frame 118. The working depth of gathering sections 124 and 126 is adjusted by rotating bolts 128 and 130, respectively.

Downward pressure is applied on harrows 136, 138, 140 and 142 and gathering sections 124 and 126 by extending hydraulic cylinder 268, thus transmitting pressure from lift frames 112 and 114 through control assemblies 192, 200, 202, 204, 218, 220, 222 and 224. When such downward pressure is applied, harrows 136, 138, 140 and 142 and gathering sections 124 and 126 are down in a field position but may be forced upwards without damage if obstructions in ground 180 are encountered. Such downward pressure is regulated by the spring 198 and the corresponding springs on control assemblies 200, 202, 204, 218, 220, 222 and 224. Such downward pressure would be applied when hydraulic cylinder 268 is in an extended condition as shown in FIG. 5. It should be understood that hydraulic cylinder 268 is connected to a source of hydraulic fluid pressure controlled by the operator of tractor 172.

When hydraulic cylinder 268 is contracted and assumes the position 268′ shown in phantom in FIG. 5, lift frames 112 and 114 are lifted upwardly. When lift frames 112 and 114 are lifted, collar 196 and corresponding collars on control assemblies 200, 202, 204, 218, 220, 222 and 224 slide into contact with lift frames 112 and 114; thus causing gathering frames 116 and 118 to lift and causing harrow frames 132 and 134 to lift. Lifting of frames 116, 118, 132 and 134 causes harrows 136, 138, 140 and 142 and gathering sections 124 and 126 to lift and assume a transport position. In such a transport position, the rock picker 20 may be towed down a road to a field where the picker 20 is to be used to collect rocks. Block 270 prevents swaying when lift frames 112 and 114 are lifted in a transport position.

Tongue bar 102 is pivotably mounted on picker frame 22 so as to be able to conform to irregularities in ground 180. Similarly, crossbar 32 is pivotably mounted on picket frame 22 so as to be able to conform to irregularities in ground 180. Working together, tongue bar 104 and crossbar 32 allow rock picker 20 to be towed across and follow the contour of ground 180 that is rolling or has hills. Picker frame 22 with wheels 24, 26, 28 and 30 forms a vehicle means for transporting across the ground 180.

In its field position, conveyor frame 38 is lowered such that bolts 40, 42, 44 and 46 touch picker frame 22. Conveyor frame 38 is preferably tilted in the field position such that a positive angle of attack 356 of approximately 4° results. Such an angle of attack allows buckets 86, 88, 90, 92, 274 and 276 to efficiently dig into the ground 180 and remove rocks 182. Frame 38 is tilted by screwing bolts 40 and 46 in further than bolts 42 and 44, so that the rear of frame 38 is further above picker frame 22 than the front of frame 38 is above picker frame 22.

Links 58 and 228 form a conveyor linkage which controls the movement of conveyor frame 38 with respect to picker frame 22. A corresponding conveyor linkage is mounted on the opposite side of conveyor frame 38 and includes link 56 and a link not shown in the drawings but corresponding to link 228. When bolts 40, 42, 44 and 46 are adjusted to set angle of attack 356, links 56 and 58 must be adjusted in fittings 164 and 166 to allow conveyor frame 38 to assume the desired angle of attack 356.

The conveyor linkages formed by links 56, 58, 228 and a link corresponding to link 228 permit only substantially vertical movement of conveyor frame 38 with respect to picker frame 22. Thus, as shown in FIG. 4, when wheel 64 encounters an obstruction rock 262, conveyor frame 38 is displaced in a substantially vertical direction. Also, as shown in FIG. 4, fitting 238 pivots on member 242 to allow hydraulic cylinder 234 to move upwardly when conveyor frame 38 is forced up by rock 262 striking wheel 64.

Conveyor frame 38 may be lifted by hydraulic cylinder 234 and a corresponding hydraulic cylinder mounted on the opposite side of conveyor frame 38. Conveyor frame 38 may be lifted to adjust the depth of penetration of buckets 86, 88, 90, 92, 274 and 276 into ground 180. The conveyor linkages formed by links 56, 58, 228 and a link corresponding to link 228 insure that angle of attack 356 is maintained substantially constant as conveyor frame 38 is lifted. Hydraulic cylinder 234 and the corresponding hydraulic cylinder mounted on the opposite side of conveyor frame 38 are connected to a source of hydraulic pressure controlled by the operator of tractor 172.

Conveyor frame 38 may be lifted to a transport position be extending hydraulic cylinder 234 and the corresponding hydraulic cylinder mounted on the opposite side of conveyor frame 38. In such a transport position, buckets 86, 88, 90, 92, 274 and 276 are lifted above the ground 180 and rock picker 20 may be towed down a road or highway.

A conveyor means is formed by guide wheels 60, 62, 64, 66, 94 and 96 and by cables 78 and 80. The conveyor means causes buckets 86, 88, 90, 92, 274 and 276 to be forced into the ground 180, through and across the ground 180 for a substantial distance, and upwardly out of the ground 180 to dump the rocks 182 collected into hopper 102. Supports 82 and 84 make contact with and support the weight of buckets 86, 88, 90, 92, 274 and 276 as each moves upwardly between wheels 62 and 64 and wheels 60 and 66. The upward motion of said buckets allows substantially all of the soil to fall out of said buckets, thus separating the rocks 182 from the soil. Said buckets are rotated and tilted when passing over guide wheels 62 and 64, thus aiding the process of separating the rocks 182 from the soil. As buckets 86, 88, 90, 92, 274 and 276 pass over upper guide wheels 60 and 66, the rocks 182 carried by said buckets are dumped into hopper 102. After being dumped, said buckets travel downwardly from wheels 60 and 66 to wheels 94 and 96 along a path having an angle 360 which preferably is 70°.

Buckets 86, 88, 90, 92, 274 and 276 are attached to cables 78 and 80 which are caused to move by the rotation of upper guide wheels 60 and 66. In the preferred embodiment, wheels 60 and 66 are driven by rotational speed provided by tractor 172 through a shaft 174. Tractor 172 provides a slip-clutch attachment to shaft 174 to prevent damage to rock picker 20 when obstructions are encountered in the ground 180. Alternatively, wheels 60 and 66 can be rotated by a hydraulic motor (not shown) or a drive train (not shown) coupled to ground engaging wheels 24 and 26. Bolts 188 and 190 are adjustable to vary the tension in cables 78 and 80 by sliding the fittings 168 and 170 along the conveyor frame 38.

A lifting linkage is formed by links 248 and 252 to lift hopper 102. A corresponding lifting linkage is mounted on the other side of hopper 102 and includes links corresponding to links 248 and 252. The lifting linkages for hopper 102 are actuated by hydraulic cylinders 260 and 324 which are connected to a source of hydraulic pressure controlled by the operator of tractor 172.

Links 248 and 252 are not parallel when hopper 102 is in a lowered position as shown in FIG. 2, so that hopper 102 is caused to tilt when placed in a raised position as shown in FIG. 10. The raised position of hopper 102 allows rocks to be dumped into the center of a truck box (not shown) and aids in the piling of rocks. The tilting of hopper 102 as it is placed in a raised position dumps the rocks collected from hopper 102. Hopper 102 has a front and bottom comprised of spaced-apart wires 314 which allow soil to fall out of hopper 102 while selectively retaining rocks.

Latch 336 is released by the push of collar 330 on lever 338 when hopper 102 is lifted to a raised position, thus allowing door 316 to open which allows rocks to dump out of hopper 102. The motion of collar 330 is caused by crank 326 acting on push rod 328. When hopper 102 is lowered, door 316 is pulled closed by collar 332 acting on flange 340. Collar 332 is equipped with a safety shear pin (not shown) to prevent damage if a rock is trapped between door 316 and hopper 102.

Wires 300 are bent in an angular shape matching that of wire 282 so that the contents of bucket 90 are agitated when bucket 90 passes over wheels 62 and 64 and wheels 60 and 66. Such agitation insures that rocks collected by bucket 90 are picked clean and separated from the soil. Wires 300 are placed in a parallel, spaced-apart arrangement to selectively retain rocks and allow soil to fall from bucket 90.

Blade 298 is equipped with notches 302 to aid in loosening rocks 182 from the ground 180. Plate 292 lends vertical support to bucket 90 and allows a front opening in bucket 90 which is large enough to accommodate large rocks.

It is anticipated that various changes may be made in the shape, construction and operation of the invention as disclosed herein without departing from the spirit and scope of the invention as defined by the following claims.

What is claimed is:

1. A rock picker comprising:
    a plurality of buckets for scraping the ground and having substantial openings which selectively retain rocks of at least a predetermined size in said buckets but which allow soil to exit from said buckets through said openings;
    conveyor means for conveying said buckets into, across, and out of the ground and for conveying said buckets such that rocks retained by said buckets may be collected, said conveyor means comprising a cable means which is attached to said buckets and a plurality of guide means for guiding said cable means such that said buckets are conveyed into, across, and out of the ground and are conveyed such that rocks retained by said buckets may be collected, wherein the angle of attack at which said buckets are conveyed across the ground is approximately 4° and wherein said conveyor means conveys said buckets upwardly away from the ground for a substantial distance such that substantially all of the soil scraped into said buckets is caused to fall from said openings in said buckets;
    vehicle means for transporting said buckets and said conveyor means across the ground; and
    collector means for collecting the rocks retained by said buckets, said collector means being mounted on said vehicle means.

2. The rock picker of claim 1 wherein said collector means comprises:
    a hopper for collecting rocks retained by said buckets; and
    a lifting apparatus for lifting said hopper to allow rocks collected by said hopper to be transferred.

3. The rock picker of claim 2 wherein said lifting apparatus comprises:
    at least one lifting linkage mounted on said transport means and attached to said hopper; and
    lifting linkage forcing means for forcing said lifting linkage to move such that said hopper is lifted to allow rocks collected by said hopper to be transferred.

4. The rock picker of claim 3 wherein said lifting apparatus further includes tilting means to cause said hopper to tilt when said hopper is lifted thus aiding rocks collected by said hopper to fall from said hopper.

5. The rock picker of claim 4 wherein said hopper further includes:
    a door which is openable to allow rocks collected by said hopper to fall from said bin; and
    a door latching means such that said door latching means allows said door to open only when said hopper is lifted.

6. The rock picker of claim 1 wherein said conveyor means dumps rocks retained by said buckets into said collector means.

7. The rock picker of claim 1 further including a pair of gathering sections for funneling rocks into said buckets.

8. The rock picker of claim 5 further including lift means for lifting said gathering sections into a transport position.

9. The rock picker of claim 8 wherein said lift means is actuateable to apply pressure on said gathering sections to force said gathering sections towards the ground.

10. The rock picker of claim 8 wherein said gathering sections are mounted to a gathering frame by a linkage and wherein said gathering sections are spring biased in a downward and forward direction from said gathering frame.

11. The rock picker of claim 1 wherein said conveyor means is mounted on a conveyor frame and wherein said conveyor frame is mounted on said vehicle means by means of a linkage which restricts said conveyor frame to motion with respect to said vehicle means in a substantially vertical direction.

12. The rock picker of claim 11 having a lifting means for lifting said conveyor frame into a transport position.

13. The rock picker of claim 12 wherein said lifting means comprises an hydraulic cylinder mounted on a fitting which is mounted on said vehicle means, and wherein said fitting is pivotable to allow said conveyor frame to move upwards when said buckets or said conveyor means encounter obstacles in the ground.

14. The rock picker of claim 1 wherein each of said buckets comprises a notched blade and a plurality of wires shaped in an angular fashion to form a structure having sides at angles of approximately 38° and approximately 48° to the horizontal.

* * * * *

UNITED STATES PATENT AND TRADEMARK OFFICE
CERTIFICATE OF CORRECTION

PATENT NO. : 4,282,932

DATED : August 11, 1981

INVENTOR(S) : Raymond R. Anderson

It is certified that error appears in the above-identified patent and that said Letters Patent are hereby corrected as shown below:

Column 2, line 20, Delete "and" after dump and substitute --the--;

Column 10, claim 8, line 1, Delete "5" and substitute --7--.

*Signed and Sealed this*

*Twenty-seventh* Day of *October 1981*

[SEAL]

Attest:

GERALD J. MOSSINGHOFF

*Attesting Officer*     *Commissioner of Patents and Trademarks*